United States Patent
Coffey (10) Patent No.: US 6,731,722 B2
(45) Date of Patent: May 4, 2004

(54) AUTOMATED TRANSACTION PROCESSING SYSTEM

(75) Inventor: Thomas J. Coffey, Lansdale, PA (US)

(73) Assignee: Callfx.Com, PA (US)

( * ) Notice: Subject to any disclaimer, the term of this patent is extended or adjusted under 35 U.S.C. 154(b) by 0 days.

(21) Appl. No.: 10/170,330

(22) Filed: Jun. 13, 2002

(65) Prior Publication Data
US 2002/0194142 A1 Dec. 19, 2002

Related U.S. Application Data (60) Provisional application No. 60/297,967, filed on Jun. 13, 2001.

(51) Int. Cl.[7] ............................. H04M 1/64; H04M 3/00
(52) U.S. Cl. ........................... 379/88.01; 379/88.07; 379/88.13; 379/88.16; 379/265.01; 379/265.09; 379/266.01; 379/266.07
(58) Field of Search ......................... 379/88.01, 88.02, 379/88.03, 88.04, 88.07, 88.13, 88.16, 265.01, 265.09, 266.07, 265.02, 266.01, 266.02

(56) References Cited

U.S. PATENT DOCUMENTS

| | | | | |
|---|---|---|---|---|
| 5,136,633 A | * | 8/1992 | Tejada et al. | 379/91.02 |
| 5,537,344 A | * | 7/1996 | Isshiki et al. | 364/725 |
| 5,555,299 A | * | 9/1996 | Maloney et al. | 379/212 |
| 5,703,943 A | * | 12/1997 | Otto | 379/265 |
| 5,884,032 A | * | 3/1999 | Bateman et al. | 395/200.34 |
| 5,999,965 A | * | 12/1999 | Kelly | 709/202 |
| 6,049,594 A | * | 4/2000 | Furman et al. | 379/67.1 |
| 6,205,215 B1 | * | 3/2001 | Dombakly | 379/223 |
| 6,269,153 B1 | * | 7/2001 | Carpenter et al. | 379/88.02 |
| 6,396,919 B1 | * | 5/2002 | Shimada et al. | 379/265.12 |
| 6,404,877 B1 | * | 6/2002 | Bolduc et al. | 379/218.01 |

* cited by examiner

Primary Examiner—Allan Hoosain
(74) Attorney, Agent, or Firm—Evelyn H. McConathy; Darryl W. Shorter; Dilworth Paxson, LLP (57) ABSTRACT

An automated transaction processing system designed to minimize human labor comprises various automated resources and at least one live operator. A transaction such as a telephone call is divided into a number of subtransactions The live operator processes only those subtransactions that cannot be processed by an automated resource or those subtransactions for which live operator processing is desirable. An automated resource is assigned to process the remaining subtransactions. One type of automated resource resource is an audiotext address generator, which automatically recognizes whether human speech over the public switched telephone network matches textual information such as a user's name and address. The system is also capable of processing transactions in media other than telephone, including internet transactions. A method for processing internet that includes synchronizing a live operator's display to an Internet user's display is also provided.

9 Claims, 8 Drawing Sheets

Call Setup Fig. 4

AUTOMATED TRANSACTION PROCESSING SYSTEM

CROSS-REFERENCE TO RELATED APPLICATIONS

This application claims priority to U.S. Provisional Application No. 60/297,967 filed on Jun. 13, 2001.

FIELD OF THE INVENTION

The present invention relates to the field of automated transaction processing and more specifically to a system and method for processing transactions that minimizes the use of humans, or live operators, while retaining many of the benefits of live operator processing.

BACKGROUND OF THE INVENTION

The field of direct marketing encompasses diverse transactions. These transactions often occur over a telephone, but are increasingly being conducted over nontraditional media including the internet. Types of transactions include processing dealer location inquiries, answering consumer product inquiries, taking customer orders, and troubleshooting product problems. Ideally, live operators would process all transactions. Live operators offer many advantages over automated systems. For example, live operators are able to recognize and deal with problem transactions, such as calls by angry customers. However, the cost of using live operators to process transactions is often prohibitive. As might be expected, when the operators are used exclusively, labor costs constitute a large percentage of the total cost of processing telephone transactions.

The high cost of using live operators has led to the use of automated systems for processing these transactions, especially transactions conducted over the telephone. However, known automated systems suffer from important drawbacks that make their use undesirable for many applications. Such systems are difficult and/or time consuming to use, often requiring users to listen to multiple menus and make choices using a touch tone telephone keypad. As a result, customers frequently become frustrated with known automated systems.

These drawbacks have led to systems that combine automated and human operators to varying degrees. Some of these partially automated systems use automation to route a call to a particular live operator. An example of such a system is one used for processing customer calls to a company for troubleshooting one of that company's products, wherein the automated portion consists of prompting the customer to select the problem product from a list of the company's products and connecting the customer to a live operator who can help the customer.

Systems such as these, however, are only partially effective at reducing costs for several reasons: First, the amount of automation achieved is relatively small. Second, the initial, automated portion of the transaction may be objectionable to some callers. Third, many inquiries may be more complicated than the automated choices. What is needed is an automated transaction processing system that automates as much of a transaction as possible without alerting the user that the system is automated, or an automated transaction processing system that automates a transaction in such a way that the user will not object to having the transaction processed by an automated system.

One labor intensive task that cannot be performed by known automated transaction processing systems is the generation of mailing addresses in computer recognizable form from address information spoken by a user of the system. Ideally, a speech recognition system would be used to perform this task. However, while present day speech recognition systems have the ability to recognize limited vocabularies from speaker independent sources, or recognize large vocabularies from speakers whom the speech recognition system has been trained to understand, they cannot yet recognize large vocabularies from speaker independent sources over the public switched telephone network. The size of a vocabulary needed to encompass all of the geographic and proper names in even a relatively small geographic area far exceeds the size of the vocabularies of the systems available today. Therefore, using speech recognition systems for automatically generating name and address information is not yet practicable.

One method for automatically generating name and address information in a computer recognizable form which is practicable today is to use the Dial Number Identification Service, or DNIS, (which provides the telephone number of the calling telephone) and ANI (automatic number identification) commercial address databases to generate an address based on the number of the phone used by the caller. This method is not very reliable, however. This is because the best commercial databases are only approximately 70% accurate, because calls are sometimes made from phones other than a caller's home phone, and because a caller may not be the member of the household listed in the database records even if the caller is calling from home, such as one spouse calling in an order on a phone listed only in the other spouse's name.

As a result, human operators are required to convert spoken name and address information to a computer recognizable form. The best systems today use a combination of human operators and ANI/commercial database methods. Human operators compare the database address obtained via ANI with the spoken response (either interactively or using recorded calls) and make any necessary address corrections to the database addresses. These methods, while an improvement over completely manual methods, are still labor intensive because a human operator must listen to every call to determine whether the database address matches the spoken address. What is needed is a system that can automatically recognize and indicate whether spoken name and address information matches name and address information in computer recognizable form.

Alternative communications media are also becoming increasingly important marketing tools. For example, the internet is becoming an increasingly acceptable alternative to telemarketing. Other technologies involving televisions and combinations of television and internet loom on the horizon. Thus, today's automated transaction processing systems must be designed to operate with these alternative media.

SUMMARY OF INVENTION

The present invention provides an apparatus and method for automating customer service transactions. The apparatus comprises a plurality of automated devices, such as voice recorders and players, voice recognition units, and audiotext address generators, as well as a plurality of live operator terminals. The invention treats a transaction such as a telephone call as a series of subtransactions. Each subtransaction has data associated with it. The data may be supplied by the system, such as data corresponding to a prompt to be made to the user; or the data may be supplied by the user, such as the user's response to a system prompt. Automated devices and live operators are treated as resources for processing the data. A transaction is processed by switching the data associated with each subprocesses to one or more appropriate resources.

Efficient use of human labor is made for two reasons. First, live operators are generally only used to process critical subtransactions or subtransactions that cannot be processed by automated resources. Automated resources are used to process the remaining subtransactions. This includes the use of voice players to play previously recorded predetermined prompts and messages, and the use of automated resources to process user input where possible and desirable. As will be discussed in further detail below, the decision as to whether to use live operators for a particular subtransaction is based on cost and quality considerations. Second, resources, including live operators, are only assigned to a particular transaction while they are required for a subtransaction. When a resource is not in use for one particular transaction, it is available as a resource to process other transactions.

The system is controlled by application control blocks that are developed for a particular application. The application control block acts as a script by defining the series of subtransactions necessary to process a particular transaction and defining the content of the prompts and messages that will be communicated to a user by the system. The application control blocks are specific to a particular type of transaction and may be specified by the provider of the goods and/or services.

For example, consider an extremely simple transaction in which a caller is responding to an advertisement seen on television by placing an order the product. The application control block for such a transaction defines a number of subtransactions including providing an introductory message, asking whether the caller wishes to order the product, inputting and processing the caller's response, deciding whether the caller has indicated a desire to order the product, and, if an order is desired, obtaining the caller's name, address and payment information (credit card number, COD, etc.).

Each subtransaction is classified as one of two "atomic" functions—"play" or "record." Play states provide information to the user (e.g. a greeting) and/or prompt the user to provide information to the system (e.g. address information). Play states are necessarily processed in real time unless errors occur. Record states are states in which user input is recorded and processed. Record states may be processed either online, i.e., as the particular subtransaction is occurring in real time, such as a live operator listening to a caller as they speak; offline, i.e., while a transaction such as a phone call is in progress but not in real time, such as a live operator listening to a recording of a spoken response made previously during the same transaction; or after the transaction has completed.

User input is always recorded regardless of whether the processing is to occur online, offline, or after the transaction has completed. Recording the input in each case improves quality by allowing for error processing. Consider a situation from the application control block described in the preceding paragraph where a voice recognition unit is assigned to process a user's response to the query as to whether the user wishes to order the product. If an error occurs, such as the response being spoken at a volume too low to be processed by the voice recognition unit, the recording may be played back to a live operator for processing. The live operator may be able to comprehend the user's response without having to ask the user to repeat the response. Quality is improved in this case since the user is not required to repeat the input.

The application control block assigns a preferred resource type to process each of the aforementioned subtransactions. Preferred resources are chosen depending upon a number of factors, including cost, quality, subtransaction type, and sub-transaction priority. Live operators are the most costly choice to process a subtransaction, but they also provide the highest quality. Similarly, there are cost/quality tradeoffs to be made between different types of automated resources. The type of resource chosen for an application often depends upon the importance of the subtransaction. For example, obtaining a credit card number may be of greater importance, and thus assigned to a different resource, than processing a subtransaction such a dealer location inquiry. Finally, the preferred resource type is also assigned based upon the type of subtransaction. As discussed above, a voice recognition unit can process a yes/no input but cannot process an address input; therefore, it cannot be assigned to a record address subtransaction.

The definition of the preferred resource type from the application control block may be overridden for a number of reasons. For example, during periods of low system load all transactions may be assigned to live operators to increase quality. A live operator may also be assigned to handle transactions for the purposes of obtaining a recording of an operator for a particular subtransaction for later playback during automated subtransaction processing. Error conditions, such as one live operator being allocated to perform two subtransactions at the same time, may also dictate overriding the preferred resource type. Another factor that may result in the override of a preferred resource type is the user's profile. A user profile consists in part of historical data about the customer, such as whether a user is a particularly good customer or a problem customer. It may be desirable to assign live operators to such customers. Finally, a decision to "lock" a transaction to a live operator for all further subtransactions in the transaction, which may be made at any point in the transaction, will also result in an override of the preferred resource type.

The user's profile, besides being used to determine whether to override the preferred resource type, is also used tailor processing to a caller. For example, the user's profile also contains the user's geographic region, which can be determined from the number from which the user is calling. International users may be processed differently from domestic users, and users in one region of the country may be processed differently from users in other regions. Still other user profile factors that may affect processing include whether a customer is a male or female and whether the customer is agitated.

One particularly useful resource in the automated transaction processing system is an audiotext address generator. This device compares a spoken address with the address obtained from a commercial ANI (automatic number identification) database based on the number of the calling telephone. The generator provides the ANI address if the addresses match. Otherwise, a no-match condition is indicated so that the address may be generated by a human. The audiotext address generator may process live input online, or process recorded input offline or after the call.

An aspect of the present invention is the ability to give the impression that the transaction is being handled by a live operator even when it is not. One way the present invention may achieve this impression is by monitoring the call for error conditions and immediately allocating a live operator to handle the call when an error condition is detected. Error conditions may include such events as a very short response to a request for information such as an address or credit card number, the caller speaking while a recorded message is being reproduced, or errors detected by system resources, such as a caller speaking too softly for an audiotext address generator to function properly.

When an error condition is detected, the system may use a delay tactic while the live operator is allocated. One type of delay tactic is to play a recording, in the same voice as the greeting, such as "I'm sorry, what did you say?" While this is occurring, the live operator (whose voice was used for the recording) is allocated in time to hear the caller's response. The response may also be recorded and replayed shortly thereafter to a live operator while a further delay tactic is employed.

Another way the present invention gives the impression that a live operator is handling the transaction is ensuring that the voices heard by the user is the same regardless of whether any particular subtransaction is being processed by an automated resource or a live operator. The system also ensures that the recordings of live operators are as natural as possible. Additionally, diversions such as playing recordings of keyboard clicks while the system is accepting data from a user add to the illusion of live operator processing.

The invention is also adapted to handle alternative media transactions. Simple e-mail processing can be performed by operators when they are not required to process calls. Other more complicated transactions are also possible. For example, in a situation where a user is having some trouble at a particular website, a connection between the user and an operator whose screen is synchronized to the caller's screen, such that the operator's screen contains all of the information on the caller's screen as well as additional information for assisting the caller, may be desirable.

An object of the invention is to provide an apparatus and method for automating the processing of transactions.

Another object of the invention is to provide an apparatus and method for processing transactions using as little human labor as possible.

Another object of the invention is to provide an automated transaction processing system that gives the impression of a live operator.

Another object of the invention is to provide an apparatus and method for automatically detecting whether text matches the content of spoken words.

Another object of the present invention is to provide an automated transaction processing system that can recognize error conditions and connect the caller to a live operator.

Another object of the invention is to provide an automated transaction processing system that can automatically detect the profile of customer and tailor the processing of the transaction accordingly.

Another object of the invention is to provide an automated transaction processing system that can process transactions in a variety of media.

These and other objects and advantages of the invention may best be understood with reference to the following detailed description of preferred embodiments of the invention, the appended claims and the several drawings attached hereto.

DETAILED DESCRIPTION OF PREFERRED EMBODIMENTS

Figure 1:
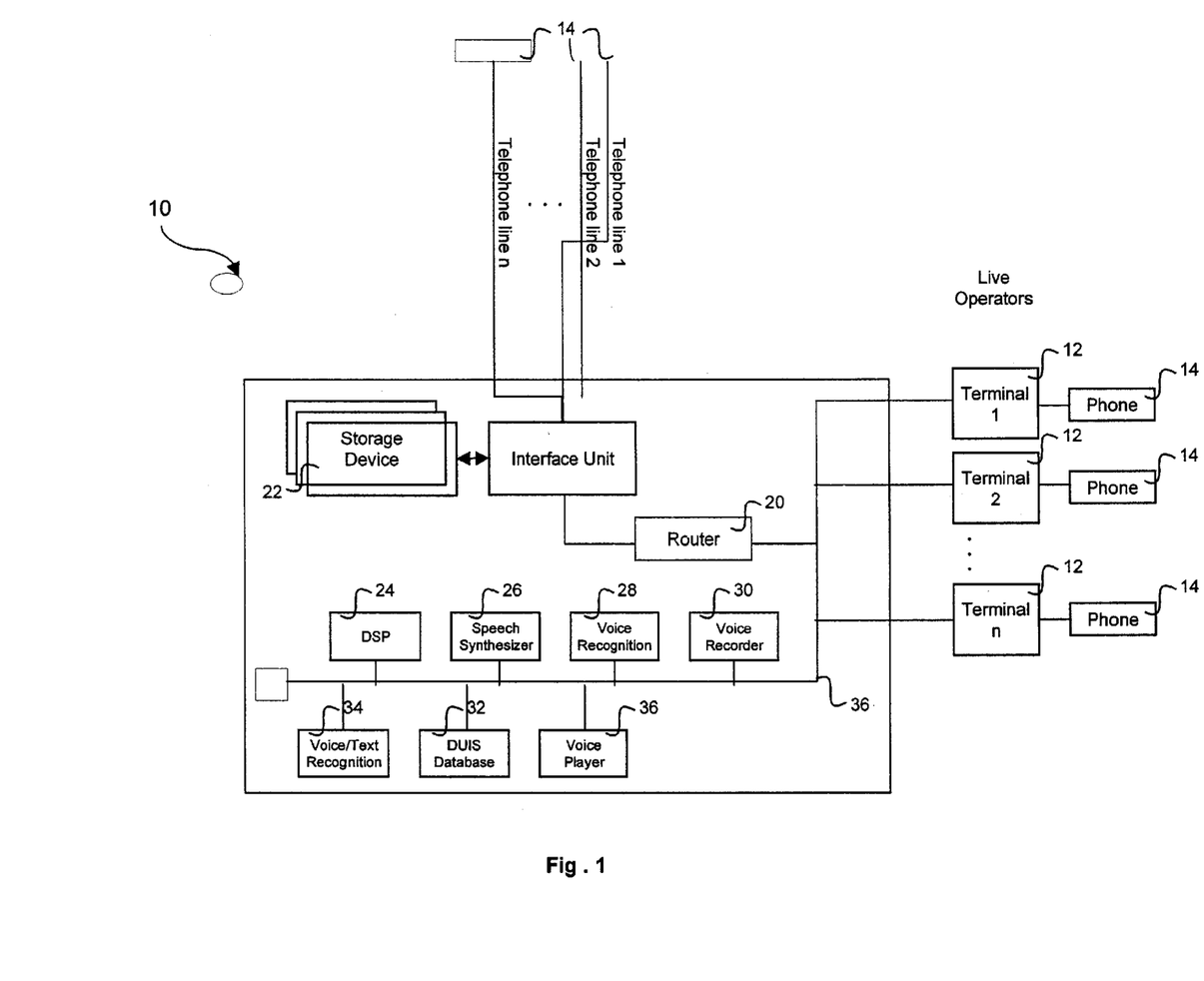
FIG. 1 is a hardware block diagram of an automated call processing system constructed in accordance with one embodiment of the present invention.

Referring now to the drawings, where like elements are designated by like reference numerals, there is shown in FIG. 1 a hardware block diagram of an automated call processing system 10 according to one embodiment of the present invention. A plurality of operator terminals 12 and input lines 16 are connected to an interface unit 18. The operator terminals 12 consist of commonly available personal computers equipped with telephones in the form of operator headsets and soundcards. The input lines 14 consist of telephone (standard POTS lines, ISDN lines, etc.) or any other medium capable of carrying data (such as cable, cellular, etc.) The data may be in a variety of formats, including analog speech, internet, etc. The interface unit 18 performs analog-to-digital conversion of voice input, low-level interface functions including DTMF detection and ANI detection for telephone calls, in addition to the high-level processing described in connection with FIGS. 2–8.

Connected to the interface unit 18 via a network are a plurality of storage devices 22 and a router 20. The storage devices comprise non-volatile storage devices, such as hard disks, flash memory, etc., for storing recorded operator prompts, caller histories, application control block information, etc., and volatile storage devices, such as RAM memory circuits, for temporarily storing items, such as user responses to questions, that are awaiting processing or playback to a live operator. The router 20, under the control of the interface unit 16, connects the input lines to the system resources via a network 38. The network 38 may be a LAN (local area network) or a WAN (wide area network). System resources include live operator terminals 12, DSP (digital signal processing) modules 24, speech synthesizer modules 26, voice recognition modules 28, voice recorders 30, ANI databases 32, audiotext recognition modules 34, and recorded voice players 36. Although only one of each type of resource is depicted in FIG. 1, it should be understood that the system contains a plurality of each type of resource.

The interface unit 18 controls the processing of transactions. An example of a transaction processed by the Interface unit 18 is depicted in FIGS. 2–5. The transaction processed in FIGS. 2–5 is a telephone call transaction, but those skilled in the art will appreciate that the processing can easily be modified for other types of transactions.

Transaction processing is illustrated in the form of state diagrams. Each state in the state diagram may be composed of a single state, or may be composed of a number of sub-states. Movement from state to state occurs when transition events are detected. Transition events may be externally generated events such as the ringing of a telephone, or may be internally generated events, such as the completion of a recording.

Figure 2:
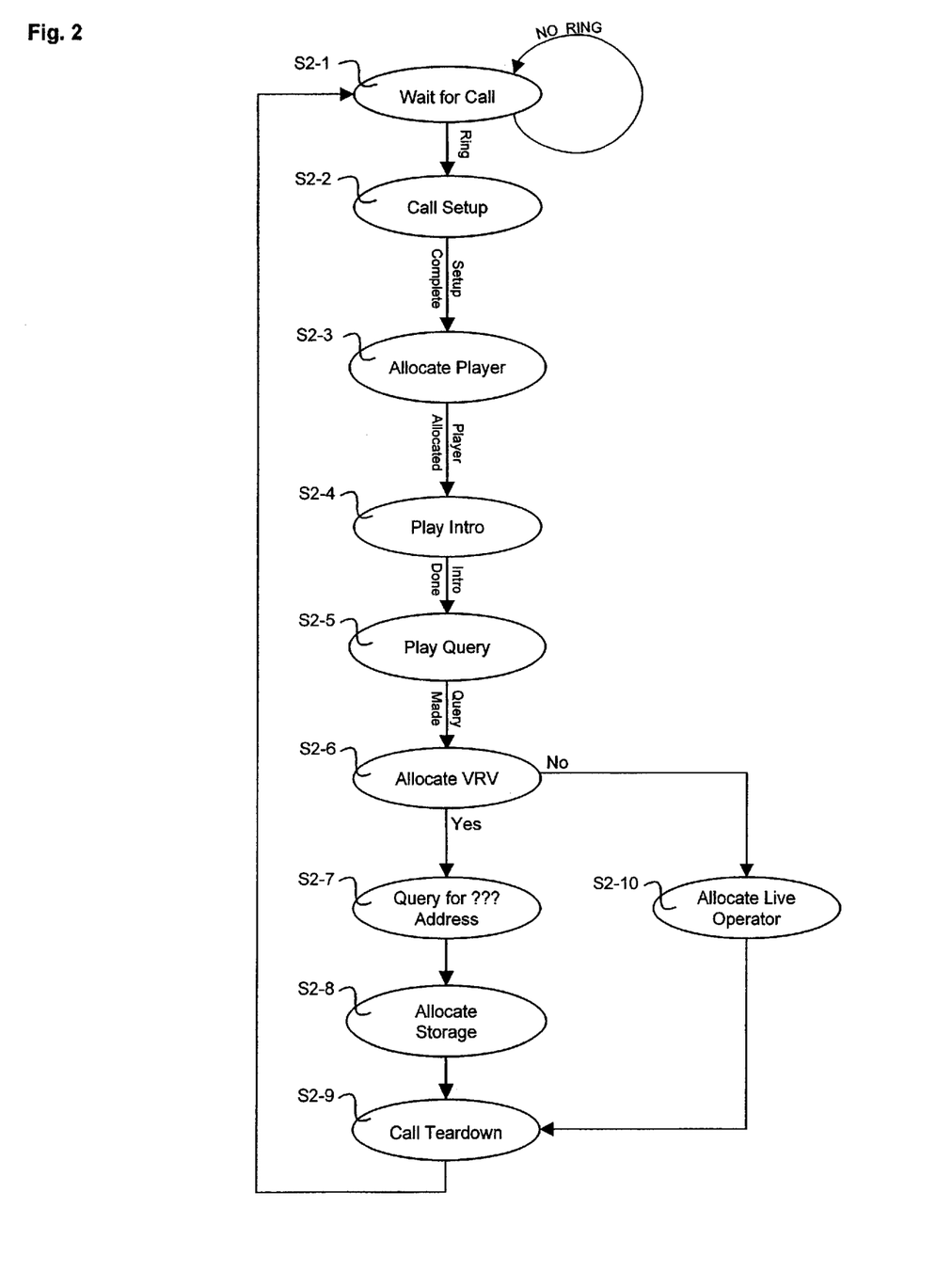
FIG. 2 is a state transition diagram depicting the general processing of a telephone call transaction.

FIG. 2 depicts the highest level state diagram. The system waits for a call at state 2-1. Upon the detection of a ring event, the system determines the telephone number of the caller through the DNIS (Dial Number Identification Service) and retrieves available information for that telephone number at state 2-2. Information such as a name and address may be available for a telephone number through a commercial database. The system may also have history information pertaining to a particular telephone number.

The information retrieved at state 2-2 is used to update the context block at state 2-3. The context block is a temporary database that contains all of the information related to a particular transaction. This information includes the information gathered at the start of a transaction such as a caller's telephone number, and is also updated to include all information obtained in the course of the transaction, such as credit card numbers, a caller's gender, survey results, etc. The context block also maintains the present state of the transaction.

The application control block for the transaction is retrieved at state 2-4. The system may have a plurality of application control blocks defined for different transactions. The applicable application control block is determined on the basis of the input line on which the call is received. As discussed above, the application control block defines a preferred resource type to process each subtransaction defined therein.

The preferred resource type defined by the application control block may be overridden at state 2-5. One reason the definition of the preferred resource type from the application control block may be overridden is that the system load (the number of transactions currently being processed by the system) is relatively low. In this case, it may be desirable to assign a live operator to handle all subtransactions to improve overall quality. Conversely, if the system load is very high, subtransactions for which the preferred resource is a live operator may be reassigned to an automated resource. The actual definition of low and high system loads are dependent upon the application and are a matter of engineering judgment.

Another reason for overriding the preferred resource type defined by the application control block is the caller profile. If the call is being made from the number of a caller whose history (contained in the context block) indicates that they are an especially good customer, or a customer that requires live operator processing, then the preferred resource types defined in the application control block may be ignored and a live operator assigned to handle all subtransactions.

Another reason for overriding the preferred resource type defined by the application control block it to obtain recorded operator prompts. A primary live operator is assigned for each call even if no subtransactions are assigned to a live operator. (As will be discussed in greater detail below, the assignment of a primary live operator does not prevent the assignment of subtransactions to other operators.) This is done so that if an error condition or some other situation requiring a live operator to speak to a caller arises, the live operator's voice will match the recorded voice.

Therefore, it is desirable to have a recording of each operator for each prompt defined in each application control block. In order to obtain recordings for each operator and each prompt, the preferred resource type may be changed from an automated resource to a live operator resource so that a particular operator may be recorded making a prompt defined in the appropriate application control block.

It is also desirable to periodically rerecord the prompts for all operators. This is done for two reasons. First, live operator voices may change over time. Second, each recording may have minor identifying characteristics, such as a background noise or a slight hitch in the operator's voice, that frequent callers may recognize upon hearing more than once.

Upon detecting a situation in which it is desirable to override a preferred resource type for the purposes of obtaining a new recording of a prompt, the context block is updated to include the identification of the particular operator for later use in the dynamic resource allocation process. It is preferable that a live operator be assigned to process all subtransactions for the call, rather than just for the particular prompts for which updated recordings are desired. This is because the recording will sound more natural in the flow of a transaction when the live operator is not aware of which prompt is being recorded.

Once the preferred resource type has been assigned, a primary live operator is assigned at state 2-6. In cases where a recording of a particular live operator is needed as discussed above, the live operator is assigned accordingly. Resource rotation also plays a role in the assignment of the primary live operator. Because, as discussed above, any particular recording may have minor identifying characteristics (as discussed above), it is desirable to distribute the assignment of primary operators among all available live operators to the greatest extent practicable to minimize the possibility that any one caller will hear the same recording twice. Distributing the assignment of live operators also helps to decrease the likelihood that a single live operator will be required to process two subtransactions at exactly the same time.

Once the primary operator has been completed at state 2-6, the system then determines whether over-usage or fraud is occurring at state 2-7. Each time a call from a particular telephone number is made, this fact is recorded in the caller history. When a new call is received, the context block is checked to determine how many calls have been made. This fact is important in situations such as contests where only a limited number of entries are allowed. Different applications may have different allowable call thresholds. The call threshold may be a simple maximum total or may be a more sophisticated threshold such as a certain number of calls in a certain period of time.

If the number of calls exceeds the threshold, a number of different actions may be taken at state 2-7. One possible action is to generate a busy signal. Another possible action is to play a recording informing the caller that the maximum number of calls has been exceeded. The action taken will depend upon the particular application.

The caller history is also updated whenever a fraudulent phone call has been made from a particular telephone number. Fraudulent calls may consist of "prank" calls or orders from customers with a history of nonpayment. Information about fraudulent calls may come from any number of sources, including the provider of the goods and/or services. When the system determines that a call is from a number with a history of fraudulent calls at state 2-6, appropriate steps, which depend upon the application, are taken by the system at state 2-7.

If no over-usage or fraud is detected at state 2-7, then application specific processing occurs at state 2-9. The details of the application specific processing will be discussed below in connection with FIG. 3.

After the transaction has completed, post call processing is performed at state 2-10. Post call processing primarily consists of logging statistical information pertaining the call.

A number of statistics are maintained for the purposes of billing and reporting to the customer. These statistics include such items as the total length of the call, the length of time required for each subtransaction, the occurrence of errors, etc.

Figure 3:
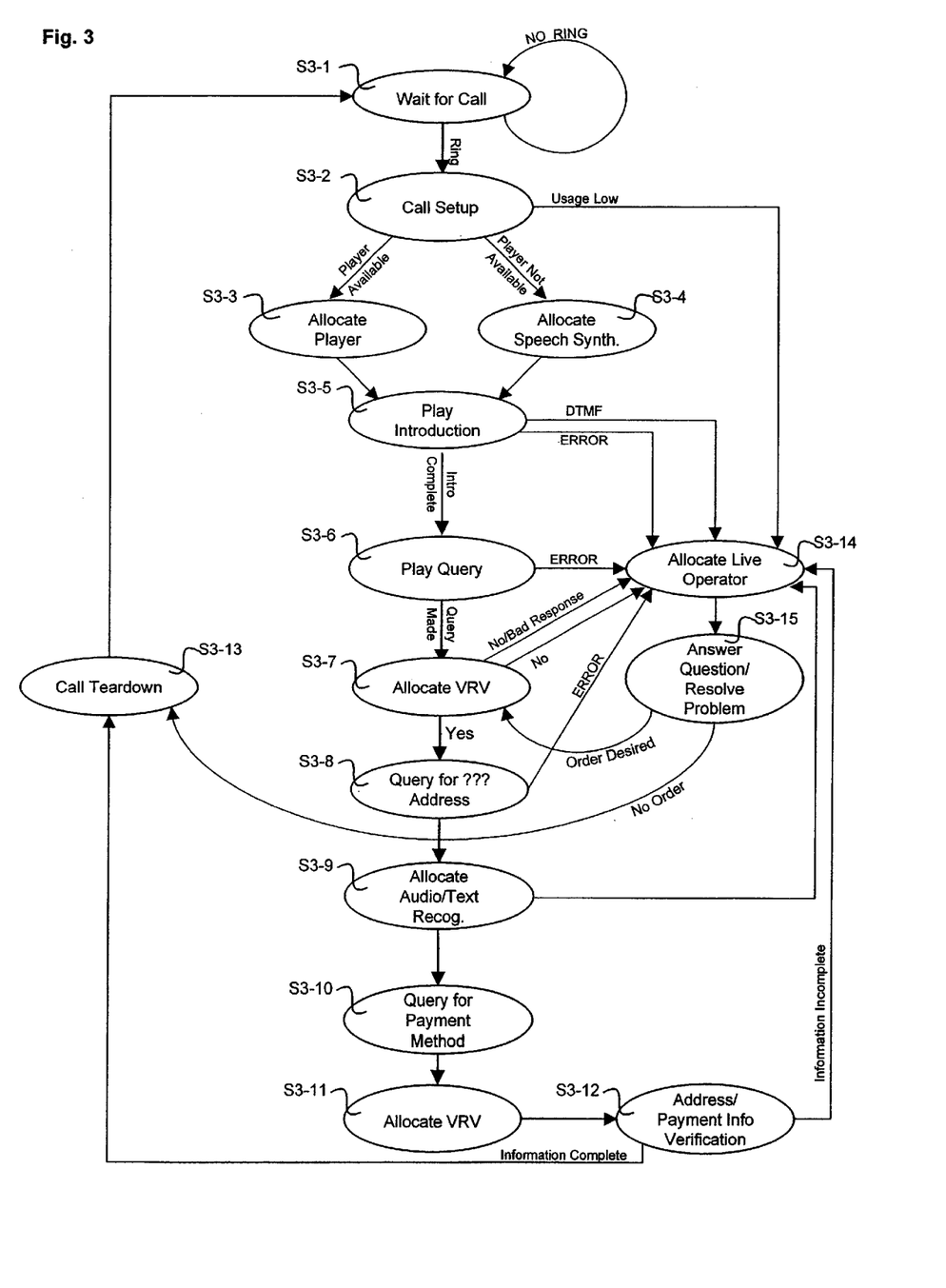
FIG. 3 is a state transition diagram depicting the application-specific processing of a telephone call.

An example of processing that may be defined by an application control block is illustrated in FIG. 3. As discussed above, each sub-transaction is classified as one of two types—play and record. For each of the play states, the information and/or prompt to be given to the user is defined. Additionally, a preferred resource type and priority have been assigned for each sub-transaction. The significance of the preferred resource type and priority will be discussed in connection with FIGS. 4 and 5.

The application control block illustrated in FIG. 3 is typical of a situation in which a customer has called in response to a television commercial or printed advertisement to order the advertised product or service. An introduction is played at state 3-1, such as "Hello, you have reached the Product X order line." In this example, the query is made by playing back a recorded voice recording. In order to give the impression of a central switchboard operator, the recorded voice will not be the same as the voice of the primary operator in this example.

After the introduction, a query, such as "Do you wish to order Product X at this time?" is made at state 3-2. The caller's response is processed at state 3-3. In this example, the response is processed by a voice recognition unit. As discussed above, voice recognition units are capable of recognizing small vocabularies from speaker independent sources over the PSTN. In this situation, the voice recognition unit is attempting to identify a simple positive or negative response. The caller response is also recorded in case the voice response unit cannot determine whether the response was positive or negative. The details of the processing performed in an error situation, such as a voice response unit not being able to recognize a response, will be discussed in greater detail below in connection with FIG. 5.

In parallel with the processing of the response at state 3-3, a recording of a voice message such as "One moment while I transfer your call" is played at state 3-4. This message is a delay tactic used to provide time for the response to be processed. This helps to preserve the illusion of the call being handled by a live operator.

If it the caller wishes to order the product, a recording of a request for the caller's credit card number is played at state 3-5. Obtaining a correct credit card number is one of the most important subtransactions to be performed. Therefore, the request for the credit card number is made early in the call to allow sufficient time to recover from any error in processing the credit card number.

In this example, a live operator has been assigned to process the sub-transaction at state 3-6. One possibility is to have the live operator listen as the speaker is speaking. However, this is not the most efficient way to process the subtransaction. A more efficient method is to record the caller's credit card number and play it back at a speed up to 25% faster to a live operator. It has been learned that playing the recording at a speed up to 25% higher, which is referred to herein as "speedy playback," does not result in any significant loss of audibility while reducing the time required for a live operator to process the subtransaction. Speedy playback may also be used when a recording is being processed by an automated resource such as a voice recognition unit.

While the credit card number is being processed at state 3-6, the system requests the caller's address at state 3-7 using a recorded voice prompt. The caller's response is processed at state 3-8 using an audiotext address generator. The operation of the audiotext address generator will be described in more detail below in connection with FIG. 7.

The system then prompts the caller for any additional transactions by playing a message such as "Is there anything else I can help you with today?" at state 3-9. If the voice response unit detects a negative response, processing is complete.

If a positive response is detected at state 3-10, the caller is prompted to input additional information at state 3-11. In this example, there is only one product available to order. Therefore, the prompt consists of a question such as "What else can I help you with today?" In applications for which a variety of products are available, the prompt may be directed toward asking for additional orders.

The caller's response as to the purpose of the call is recorded at state 3-12. While a live operator is listening to the stated purpose of the call in speedy playback mode, a delay message, similar to the delay message of state 3-4, is played at state 3-13. This live operator may be the originally assigned primary operator, or may be a new primary operator that is specially trained to answer questions that cannot be provided for in an application control block. The resolution of the issue being raised by the caller occurs at state 3-14. The resolution is performed by a live operator in this example, but other possibilities (such as asking the caller to record a message and processing the recording at a later time) are also possible.

It is possible for processing to transition in either direction between non-standard processing and standard processing defined by an application control block. In the above example, if the caller has an initial question at state 3-3 which is resolved at state 3-14 and then indicates a desire to order the product, the operator may then force a transition to state 3-5 to take the product order. Transitions between standard application control block processing and non-standard processing may also occur during error conditions, when an operator speaks with a caller to resolve a problem and then forces a transition to a state to put the caller "back on track."

An additional feature that should be noted is that while FIG. 3 indicates a preferred resource type for each subtransaction, the processing is independent of the resource type that actually processes the subtransaction. Resources are allocated dynamically at each state. As will be discussed in further detail below, a call may be "locked live" in a number of circumstances. Locking a call live will result in the preferred resource type being overridden and the assignment of a live operator for all subtransactions while the call is locked live. It is also possible for a call to be unlocked by a live operator. That is, once the reason for a call being locked live (e.g. error condition, angry customer) has been ameliorated, an operator may decide to remove the locked live condition and allow the preferred resource types to control further resource allocation.

Figure 4:
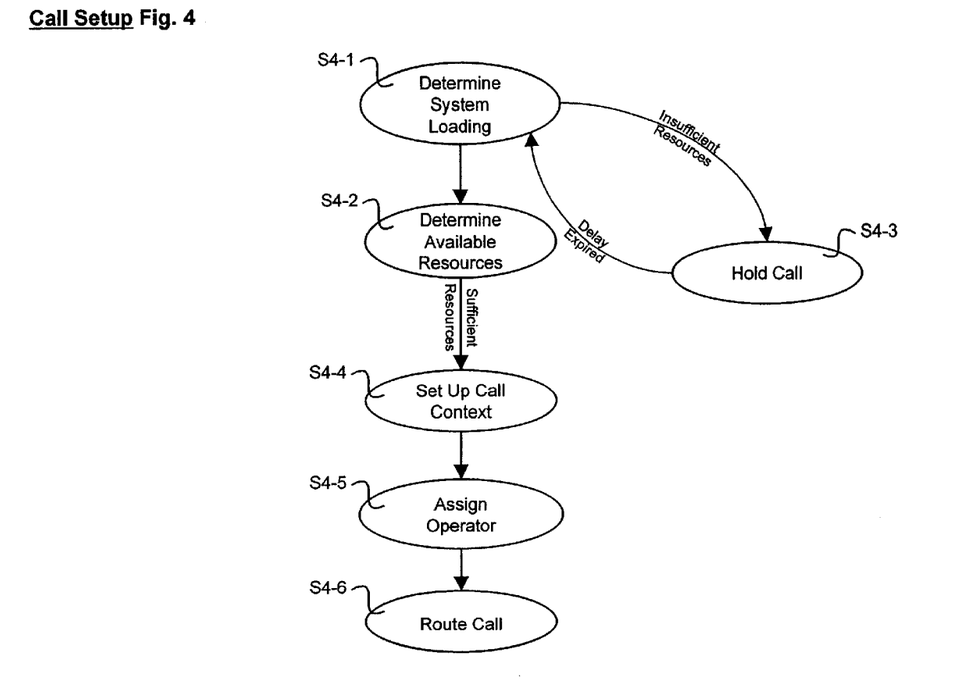
FIG. 4 is a state transition diagram of a play state.

FIG. 4 illustrates a "PLAY" state. The state number is obtained from the context block at state 4-1 and the content of the message or query is obtained from the application control block at state 4-2. Next, the preferred resource type is retrieved at state 4-3. The application control block is also checked to determine whether the preferred resource type has been overridden by having a call "locked live." As discussed above, a call may be "locked live" for the purposes of obtaining a recording of a particular live operator. A call may also be locked live upon the detection of an error, as discussed below.

If the preferred resource type is an automated resource, resource availability is checked at state 4-4. If more than one resource of the preferred type is available, then an individual resource is selected. To ensure that the effect of a malfunction in any individual resource is minimized, the individual resources are rotated such that the overall processing load is distributed among all available resources. If no resource of the preferred resource type is available, an alternate resource is assigned at state 4-5. A live operator and a speech synthesizer are appropriate alternate resources for a voice player in play states. Once an individual alternate resource has been identified, the data is sent to that resource at state 4-6. If no resource is available to process the subtransaction, error processing occurs at state 4-13.

If it is determined that the preferred resource type is a live operator at state 4-3, the availability of the primary live operator is checked at state 4-7. If the primary live operator is available, the data is sent to the primary live operator at state 4-12.

If the primary live operator is not available at state 4-7, the availability of a recording for the message to be spoken by the primary operator is checked at state 4-8. A recording might be available for a particular message even though a live operator has been assigned to speak to the caller in situations such as when the live operator has been assigned solely for the purpose of obtaining a new recording. In this situation, the desired recording may be obtained on the next call. By playing the recorded voice message, the necessity of changing primary operators is avoided.

If no recording is available at state 4-8, the system determines at state 4-9 whether any live operator is processing a subtransaction for which preemption is possible. Preemption is possible when a live operator is processing a subtransaction with a lower priority. Other tasks may also be preempted provided that they have a lower priority. If preemption is possible at state 4-9, the data is sent to the appropriate resource at state 4-6.

Tasks such as e-mail processing and offline processing of recorded user input are assigned low priority. These tasks may be preempted without any loss of information or quality. Tasks such as obtaining a credit card number are usually assigned high priority due to their importance. Any number of priority levels may be used. The exact number of priority levels and the assignment of priorities to individual states are dependent upon the application and are a matter of engineering judgment.

In the example illustrated in FIG. 3, only three priority levels are used: low, medium, and high. The only high-priority subtransactions are the credit card-related states 3-5 and 3-6. The processing at states 3-11 to 3-14, which are entered when the caller does not indicate they wish to place an order for a product, are assigned low priority. All remaining states are assigned medium priority. Thus, in the example illustrated in FIG. 3, all other transactions may be preempted if resources are not available for credit card subtransactions, and all non-order related states 3-1 to 3-10 may be preempted by any order related state 3-11 to 3-14.

If preemption is not possible at state 4-9, a delay message informing the caller that it is now necessary to switch operators is performed at state 4-10. A new primary operator, for which a recording of the prompt is available, is assigned at state 4-11. The context block is updated to reflect the new primary operator assignment at the same time. The recording is sent to a recorded voice player at state 4-6.

Once the data has been sent to the appropriate resource at state 4-6, the resource processes the data and plays the information to the caller at state 4-12. Processing may consist of a live operator reading the information to the caller, a voice player playing back a recording of a message to the caller, or a speech synthesizer synthesizing a spoken message from ASCII text at state 4-12.

If any errors are detected during the play state, error processing occurs at state 4-13. Errors that may occur during a play state include a user speaking while a prompt is being made, the failure of an automated device, or the unavailability of a device. One method of processing an error is to "lock the call live" and have a live operator speak to the caller. The actual processing performed upon the detection of an error will depend upon the application.

The final processing performed in the play state is to record statistical information in the context block at state 4-14. This information includes the amount of time taken to process the subtransaction, the resource type and identity of the individual resource used, and the occurrence of any errors. This information is in addition to and more detailed than the information stored at state 2-10 during post-call processing.

Figure 5:
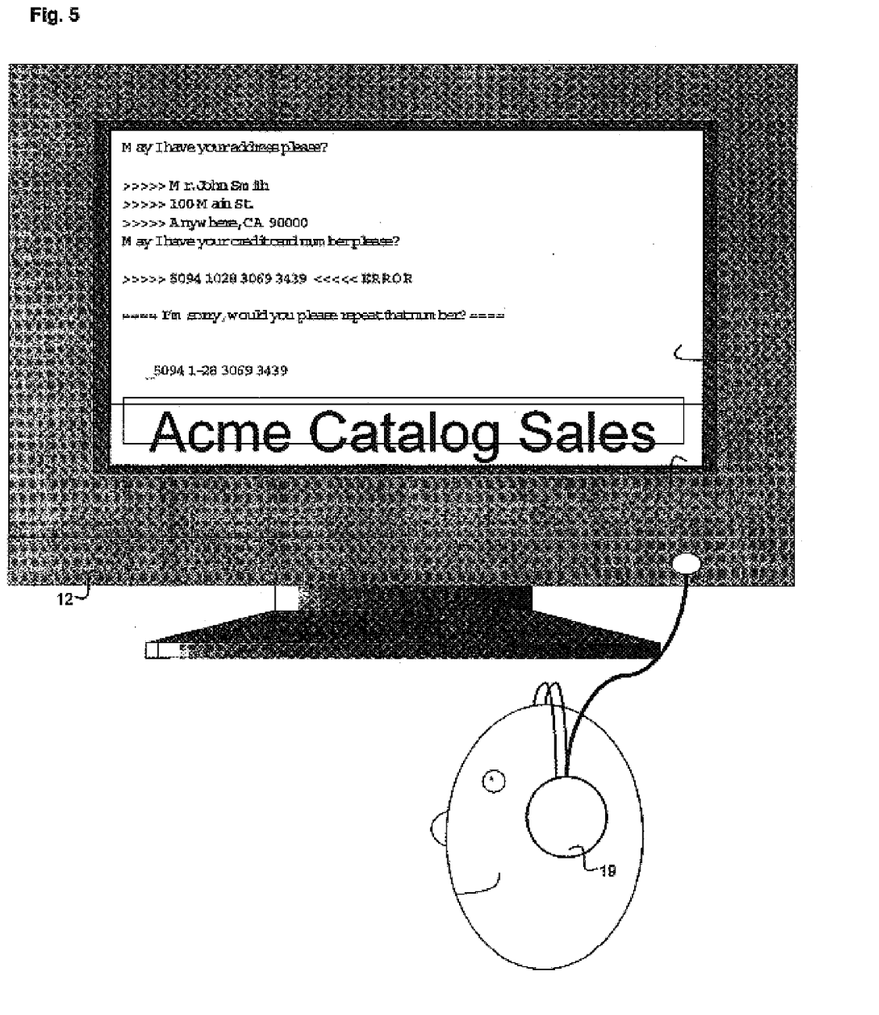
FIG. 5 is a state transition diagram of a record state.

FIG. 5 illustrates a record state. The state number is obtained from the context block at state 5-1. The user input is recorded at state 5-2. In this embodiment of the invention, the data is sampled at an appropriate rate, converted from analog to digital form, and stored on a non-volatile storage device 22 (FIG. 1). As explained above, the user response is recorded regardless of the preferred resource type or whether the subtransaction is to be processed online, offline, or after the call.

Next, the preferred resource type is retrieved at state 5-3. The application control block is also checked to determine whether the preferred resource type has been overridden by having a call "locked live." If the preferred resource type is an automated resource, resource availability is checked at state 5-4. If more than one resource of the preferred type is available, then an individual resource is selected. To ensure that the effect of a malfunction in any individual resource is minimized, the individual resources are rotated such that the overall processing load is distributed among all available resources.

If no resource of the preferred resource type is available, an appropriate available alternate resource is assigned at state 5-5. Resources types are not always interchangeable; the type of transaction must be considered when assigning an alternate resource. For example, a live operator and an audiotext address generator may be interchangeable for the purposes of generating an address, but a voice recognition unit could not be used for this purpose. Once an alternate resource type and an individual alternate resource has been identified, the data (recorded user input) is sent to that resource at state 5-6. If no resource is available to process the subtransaction, error processing occurs at state 5-13.

If the preferred resource type is identified as a live operator at state 5-3, the availability of the primary live operator is checked at state 5-7. If the primary live operator is available, the data is sent to the primary live operator terminal at state 5-6. The primary live operator is the first choice because of the possibility of an error requiring the operator to speak to the user arising. If the primary live operator is not available, an available alternate operator is searched for at state 5-8. It is possible to assign an alternate live operator to process a record subtransaction without informing the caller of this fact because the operator is not required to speak to the caller in order to process this type of subtransaction. If more than one alternate live operator is available, one is chosen to process the subtransaction. The choice of an alternate live operator may depend upon any special skills possessed by the available live operators and the type of subtransaction. The system may store such information about individual operators in operator profiles. For example, certain live operators may be especially proficient at processing credit card numbers. If such a live operator is available, and this subtransaction is a credit card number, that live operator will be chosen as the alternate live operator.

If no alternate live operator is available, the availability of an alternate automated resource is checked for at state 5-9. As discussed above, resources are not always interchangeable. Whether an automated resource can be substituted depends upon the particular subtransaction to be performed. If an appropriate alternate automated resource is available, the data is sent to it at state 5-6.

If no alternate automated resource is available at state 5-9, the system determines whether preemption is possible at state 5-10. If a lower priority task is found, that task is preempted and the data is sent to the resource at state 5-6. It should be noted that both live operators and automated resources may be preempted if either one of them are performing lower-priority tasks.

If no resource is available to process the subtransaction, the subtransaction is scheduled for offline processing at state 5-11. When an appropriate resource becomes available, the recorded data is retrieved and sent to it for processing. This processing may occur while the caller is still connected to the system. As discussed above, the placement of critical subtransactions early in an application control block provides extra time for resources to become available to process the critical subtransaction. This extra time allows for error detection and correction while the caller is still connected. If the system load is such that no resource becomes available to process the subtransaction before the end of the call, then the recorded data must be relied upon.

After the data has been sent to the resource at state 5-6, the resource processes the data at state 5-12. If any error occurs, error processing occurs at state 5-13. Error processing consists of asking the caller to repeat the information and reprocessing it. A live operator is the preferred resource type in error situations, but an automated resource may be allocated if no live operator is available. Delay tactics may be used to gain time for a live operator to become available. If no error is detected at state 5-12, the context block is updated with the information obtained from the resource processing at state 5-14.

An important aspect of the automated transaction processing system is its ability to give the impression of a live operator even when the call is partially or wholly automated. A number of techniques are employed to create this impression. For instance, every attempt is made to ensure that all recordings that are played during the transaction are in the primary operator's voice so that if the primary operator is required to speak to the caller, the voices will match. As discussed above, recordings of operators for playback are made during actual calls. However, even when the operator is not aware of the specific subtransaction or subtransactions being recorded, if the operator is aware of the fact that at least some portions of the transaction are being recorded, the recording will often sound stilted and artificial. This problem can be overcome by assigning the operator to handle a number of transactions such that the operator does not know from which particular transaction the recording will be made.

Another technique that can be used to make automated processing appear more life-like is playing recordings of keyboard clicks while record state processing is occurring. Keyboard click recordings are appropriate when information such as names and addresses is being supplied by a caller. Other techniques include the use of delay tactics while processing is occurring. Delay tactics include playing recordings of an operator asking the caller to "please wait for a moment" or something similar while the data supplied by the user is entered. A number of these delay tactic recordings, each with different messages, are made for each operator and chosen at random to prevent the user from recognizing any pattern to the messages in order to preserve the illusion of live operator processing.

Figure 6:
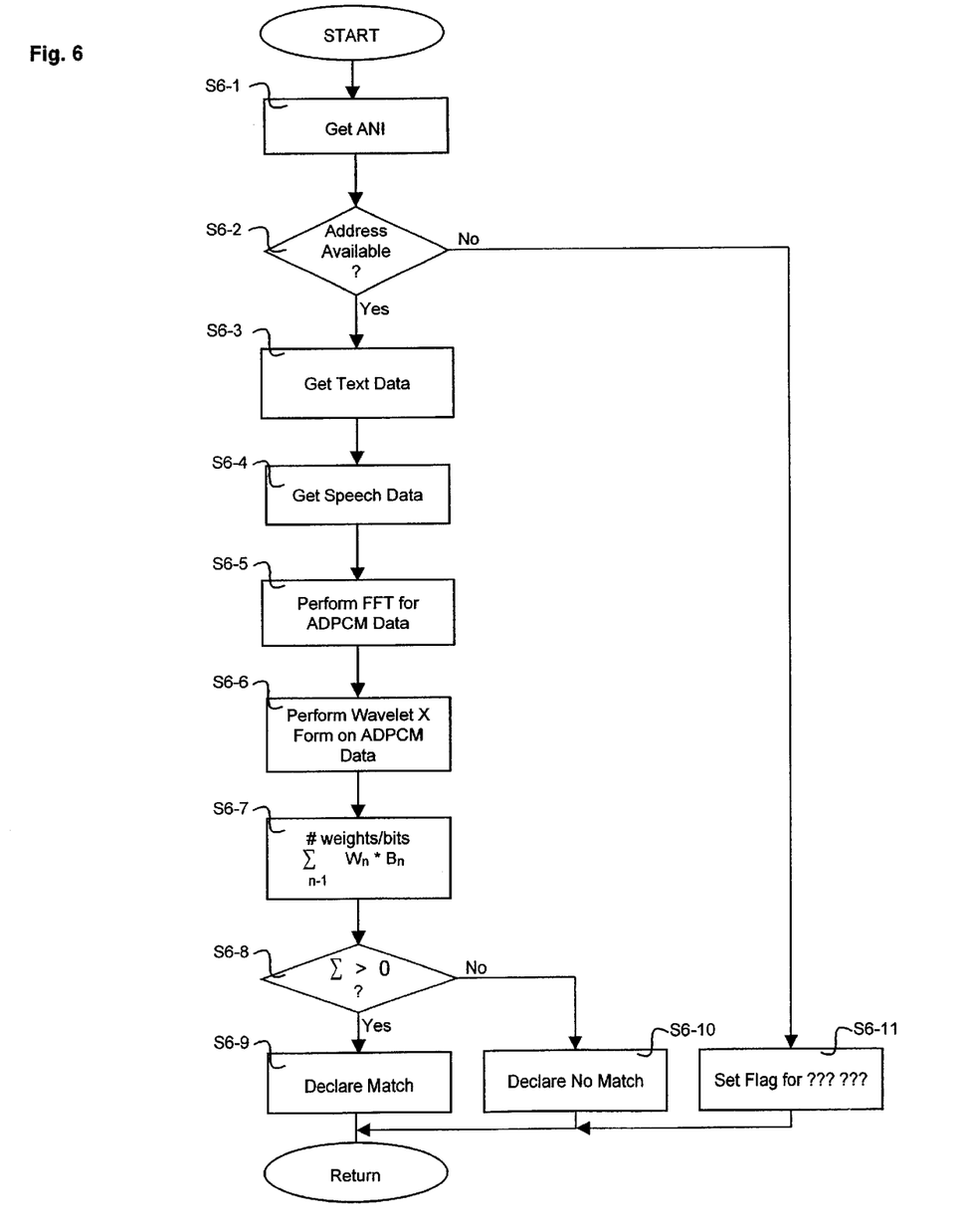
FIG. 6 is a screen display of the live operator terminal of FIG. 1.

When a live operator is called upon to perform a subtransaction, especially in an error processing situation, information about the call such as that shown in FIG. 6 is displayed on the operator's terminal to put the subtransaction into context for the operator. Providing such a display to an operator is especially useful in situations where the operator processes subtransactions from a large number of distinct applications. A bottom display area 18 contains an indication of the telephone number that has been dialed by the user, in this case the number for ordering from the Acme Catalog. The first line of text on screen 16 displays an address query that has been made to the caller. The next three lines, which are preceded by a '>>>>>' symbol to indicate to the operator that they contain information obtained from the caller, display the address provided by the caller. Next, a query for the caller's credit card number is displayed, followed by the customer's response. On the same line as the customer's response, an "<<<<<ERROR" indication alerts the operator to the fact that the credit card number provided by the caller is incorrect. The caller's recorded spoken response may be replayed to the operator through the headset 120 connected to the terminal 112. The operator is prompted to ask the customer to repeat the credit card number by the next line, which contains "=====" prompts to notify the operator that he or she is to make this query. The incorrect credit card number is repeated on the last line of the display, and a cursor is placed at the start of the line so that the operator may make the necessary corrections.

Figure 7:
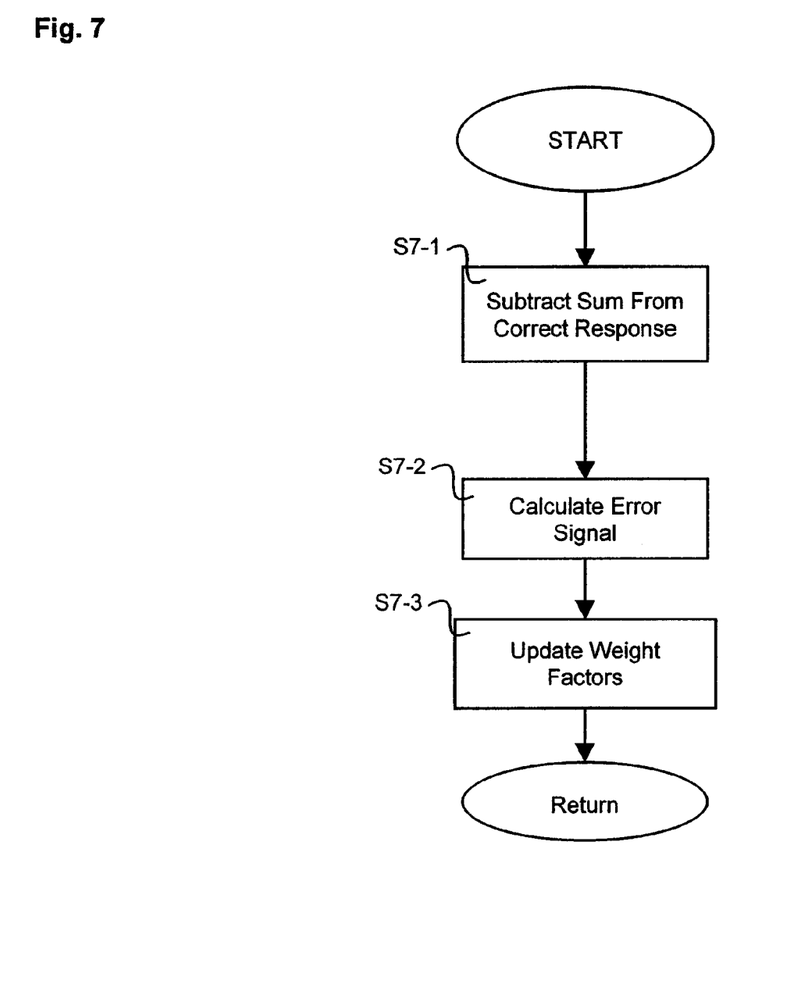
FIG. 7 is a flowchart illustrating the processing performed by an audiotext recognition system.

FIG. 7 is a flow chart illustrating the processing for the audiotext recognition device referred to in the description of FIG. 1. The telephone number from which the call has been placed is determined through the DNIS at step 7-1. A commercial database supplies known addresses corresponding to telephone numbers. If no address is available from the ANI commercial database at step 7-2, an error flag is set at step 7-11. If an address is available at step 7-2, it is retrieved at step 7-3.

The speech data is accessed at step 7-4. Human speech over POTS (plain old telephone system) lines ranges from approximately 30 to 3200 Hz. In one embodiment, 4 bit samples of the speech are taken at a 6 kHz rate. 42.67 seconds are allocated for the name and address information. Thus, the total number of bits is $2^{20}=1,048,576=42.67$ seconds*6144 samples/second*4 bits/sample. The number of seconds is chosen such that the total number of bits is equal to a power of 2. If this process is being performed after the call has been completed, the recorded speech data is decompressed at step 7-4. A conventional fast Fourier transform (FFT) is performed on the raw speech data at step 7-5. A four level fast wavelet transform (FWT) is performed on the same raw speech data at step 7-6. A biorthogonal, symmetric, binary coefficient wavelet is used for ease of implementation.

The bit stream $B_t = B_r + B_f + B_w + B_a$ is constructed at step 7-7, where $B_r$ is the raw sampled speech bit stream, $B_f$ is the bitstream of fast Fourier transform coefficients, $B_w$ is the bitstream of fast wavelet transform coefficients, and $B_a$ is the ASCII address bitstream obtained from the commercial database. The relative starting and ending first bit of each respective component bit of the bit stream $B_t$ are constant. The component bit streams are zero padded if necessary.

It may be desirable to process the name and address information in separate portions. One reason for processing separate portions is to allow parallel processing. The information may be broken into separate portions such as name, street address, city, state and zip code. The same technique that is applied to the entire name and address information is applicable to each portion.

Each bit of the bitstream is then multiplied by an associated weight factor, $W_t$. The determination of the weight factors will be discussed below. The results are then summed. If the sum is greater than 0 at step 7-8, a match is declared at step 7-9, indicating that the address retrieved from the commercial database matches the spoken address. If the sum is less than or equal to 0 at step 7-8, a mismatch is declared at step 7-10.

The determination of the weight factors Wt is made during a training period. During the training period, the system is supplied with a number of samples of spoken and ASCII addresses and an indication as to whether the addresses match. The weight factor determination is an iterative process in which samples are input into the system and the weight factors are updated until an acceptable error rate is obtained.

Figure 8:
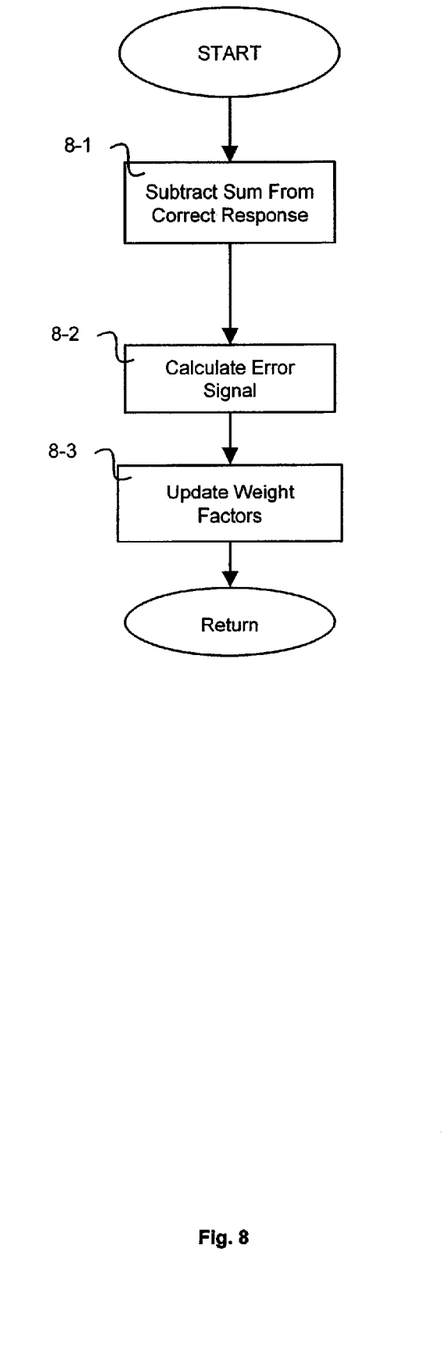
FIG. 8 is a flowchart illustrating a coefficient determination process for the audiotext recognition system of FIG. 7.

The calculation of the weight factors begins with the weight factors set to an initial value. A first sample is then input to the system. The processing described previously in connection with FIG. 7 is performed. At the conclusion of that processing, as illustrated in FIG. 8, the sum of each bit of the bitstream multiplied by its corresponding weight factor is subtracted from the correct response at step 8-1. The correct response is set to 1 if the spoken and ASCII addresses match or set to 0 if they do not match. The difference between the correct response and the sum is the error signal, E, calculated at step 8-2. The weight factors are then updated at step 8-3 according to the formula $W_{t,n} = W_{t,n-1} + (((2*E)/t)*B_t)$, where $W_{t,n}$ is the new weight value corresponding to bit $B_t$ in the bitstream, $W_{t,n-1}$ is the old weight value corresponding to bit $B_t$ in the bitstream, and the other values have the meanings previously defined.

The total number of samples required for the training set depends on the acceptable error rate. The best results are obtained from processing actual archived transactions. This can be achieved by processing previously archived past transactions. Once the system has processed a sufficient number of archived transactions such that the error rate is at an acceptable level, it is ready for use.

The audiotext address generator may be modified to detect caller characteristics such as the caller's gender and whether the caller is agitated. This can be accomplished by changing the composition of the bit stream to suit the characteristic to be detected. For example, the frequency content of the caller's voice is often indicative of the gender. Thus, the bitstream of a gender characteristic detector will include a fourier transform of the caller's voice. Similarly, the amplitude of the caller's speech may be indicative of agitation; thus, amplitude information will be included in the bitstream of an "anger" characteristic detector.

Information such as whether the caller is agitated and the gender of the caller may be used by the system in a variety of ways. For example, if the anger characteristic detector indicates that the caller is angry, the call may immediately be locked live. In another example, the results of the gender characteristic detector may be used to tailor a prompt to the gender of the caller to further enhance the illusion of live operator processing. Thus, if the caller is a male, the system may prompt the user for a credit card number as follows: "May I have your credit card number, sir?" Similarly, for a female, the prompt would be "May I have your credit card number, ma'am?" If the results of the gender characteristic detector were indeterminate, a generic prompt could be used: "May I have your credit card number, please?"

The automated transaction processing system may also be adapted to behave as an automated system to accomodate those users who actually prefer automated systems. As mentioned above, the interface unit performs DTMF detection. One way the automated transaction processing system may accomodate users who prefer automated systems without destroying the illusion of live operator processing is to allow users to input PINs from their touch-tone keypad at any time during the transaction, and to switch from an apparently live mode to an apparently automated mode when the system detects a valid PIN. One advantage to this particular scheme is that the PIN may be used to positively identify the user and to tailor the apparently automated processing to that user.

The automated transaction processing system is also capable of processing internet related transactions. The telephone lines 14 shown in FIG. 1 may also comprise internet connections for providing this capability.

One simple type of transaction is e-mail correspondence. Like other transactions, e-mail processing may be partially automated. For example, e-mail correspondence may be searched for occurrences of the phrase "your address" or "your mailing address." The system may then start a draft response that includes the requested address. Human operators would then review the draft response and make changes as necessary.

Because of its nature, e-mail correspondence processing is especially suited to being preempted and is often assigned the lowest priority. Thus, E-mail can be processed by operators while they are awaiting assignment to other subtransactions. When an e-mail subtransaction is being processed by an operator, the operator terminal screen displays the e-mail correspondence so that the operator may draft a response. If a preemption situation arises, a pop-up window with the appropriate background information and script (such contents of the screen shown in FIG. 5) may appear. When the operator has completed the preempting subtransaction, the pop-up window collapses and the operator is again presented with a display of the email correspondence for completion of the response.

A more sophisticated alternative media transaction involves synchronizing a live operator to a customer at a website (World Wide Web site). Such a transaction may arise, for example, when a potential customer, or user, has visited a retailer's website to get information about a particular item, but cannot locate the proper link to access the information or has a question that is not answered by the information. The website may provide an operator assistance link for such a situation. Following this link may lead to a screen where a specially allocated unique number appears for the visitor to contact an operator.

When the website visitor calls the number, the automated call processing system determines which user the number has been allocated to. The live operator is then synchronized to that user such that the operator and user are looking at the same information. The operator can then describe what actions are necessary to the user (such as click on this button, go back one screen, etc.) so that the user can access the desired information. The system may also provide dual control to both the user and operator, so that either or both of them may control the screen. At the conclusion of the transaction, the number is deallocated and is available for future users.

Many other schemes may be used to identify the user to the system so that the user and operator displays may be synchronized. For example, rather than providing a user with an number, a user may be required to e-mail an internet address and/or telephone number to the system. An assigned operator with a synchronized display would then call the telephone number provided by the user. A similar scheme would be to require users to register at a website. A password assigned during a registration process, rather than an internet address, would then be e-mailed by a user wishing to talk to a synchronized operator. "Cookies" may also be used to assist in synchronizing user/operator displays. Finally, in some applications, such as web TV and web phone, the visitor's IP address may be predetermined.

Just as the caller profile was used to tailor telephone transaction processing to a particular caller, the synchronized operator display may also be tailored for a particular visitor. For example, in a situation where the website may be used for ordering accessories for products manufactured by a company, the visitor's profile might include such information as the exact model number of the product owned by the visitor to ensure that the correct accessories are ordered. This information could then be shown on the operator's portion of the synchronized screen. The content of the website itself may also be changed depending upon the visitor profile. Other information, such as name, address, gender, geographic location, etc., may also be used to tailor the website to the individual visitor when such information is available. These techniques are not limited to synchronized transactions and may be used for any type of internet transaction wherein profile information about a user is available.

The call processing techniques heretofore discussed are applicable to a variety of media including telephone, interactive video, and the internet. Because of this, format conversion may become necessary. For example, all of the recordings of the operator voices are stored in 24K ADPCM format. If an incoming phone call is an internet phone call, it may be necessary to convert the 24K ADPCM recordings to 32K ADPCM or some other format. Format conversion may be accomplished by specialized resources or by digital signal processing modules running special purpose algorithms. It is also possible to use the user's PC as a resource to perform format conversion.

The above description and drawings are only illustrative of preferred embodiments which can achieve and provide the objects, features and advantages of the present invention. It is not intended that the invention be limited to the embodiment shown and described in detail herein. Modifications coming within the spirit and scope of the following claims are to be considered part of the invention.

What is claimed as new and desired to be protected by Letters Patent of the United States is:

1. An automated transaction processing system comprising:
    a communication interface;
    an interface unit connected to the communication interface for controlling the processing of transactions;
    a storage device connected to the interface unit for storing recorded subtransactions, application control block information and context block information;
    a plurality of resources adapted to process data associated with subtransactions, including both automated resources and a live operator terminal for providing data to a live operator; and
    a network for connecting the resources and the interface unit;
    wherein a transaction is processed by dividing the transaction into a series of subtransactions, each with associated subtransaction data, transmitting the subtransaction data to appropriate resources for processing, and providing the results of the processing to a user of the system; wherein all subtransactions requiring information to be spoken to a user by a liver operator and played to a user by an automated resource are spoken and played in the same voice.

2. The automated transaction processing system of claim 1, wherein the network is a local area network.

3. The automated transaction processing system of claim 1, wherein the network is a wide area network.

4. The system of claim 1, wherein said resources include audiotext recognition units for automatically deciding whether speech information matches textual information.

5. The system of claim 1, wherein subtransactions may be processed online, offline, or after the transaction has completed.

6. A method of processing transactions, the method comprising the steps of:
    dividing the transaction into a series of subtransactions;
    assigning each subtransaction to a live operator or an automated resource for processing;
    transferring a subtransaction to the assigned live operator only upon the occurrence of an error condition or other predetermined condition; thereby allowing a single live operator to process more than one call at a time wherein all subtransactions requiring information to be spoken to a user by a liver operator and played to a user by an automated resource are spoken and played in the same voice.

7. The method of claim 6, further comprising using delay tactics when a condition requiring a live operator occurs and a live operator is not available.

8. The method of claim 6, further comprising the step of recording data provided by the user for each subtransaction for which user data is required.

9. The method of claim 8, further comprising the step of processing the user data by playing back the recorded data at a speed of up to 25% faster than the speed at which the user data was recorded.

* * * * *